United States Patent [19]

Viets

[11] Patent Number: 4,734,079

[45] Date of Patent: Mar. 29, 1988

[54] APPARATUS FOR SUPPRESSING TORSIONAL VIBRATIONS AND RADIALLY ACTING FLEXURAL VIBRATIONS OF ROTARY SHAFTS

[75] Inventor: Adalbert Viets, Saarbrucken, Fed. Rep. of Germany

[73] Assignee: Tschan GmbH, Neunkirchen-Saar, Fed. Rep. of Germany

[21] Appl. No.: 900,910

[22] Filed: Aug. 28, 1986

[30] Foreign Application Priority Data

Aug. 30, 1985 [DE] Fed. Rep. of Germany ....... 3531115

[51] Int. Cl.$^4$ ............................................. F16F 15/12
[52] U.S. Cl. ..................... 464/17; 74/574; 188/379; 464/83; 464/180
[58] Field of Search ................ 74/574; 188/378, 379; 464/17, 83, 85, 89, 90, 91, 111, 180

[56] References Cited

U.S. PATENT DOCUMENTS

| | | | |
|---|---|---|---|
| 2,491,734 | 12/1949 | Hirst | 464/90 |
| 2,594,555 | 4/1952 | Hardy | 74/574 |
| 2,949,021 | 8/1960 | Charlesworth | 464/180 X |
| 3,650,361 | 3/1972 | Fossum | 74/574 X |
| 3,678,708 | 7/1972 | Ernst et al. | 464/89 X |
| 4,114,472 | 9/1978 | Hornig et al. | 464/180 X |
| 4,224,835 | 9/1980 | Bauer | 74/574 |
| 4,307,627 | 12/1981 | Sullivan | 464/89 X |

FOREIGN PATENT DOCUMENTS

| | | | |
|---|---|---|---|
| 2745737 | 4/1979 | Fed. Rep. of Germany | 188/379 |
| 3314502 | 10/1984 | Fed. Rep. of Germany | 74/574 |
| 3334393 | 4/1985 | Fed. Rep. of Germany | 74/574 |
| 3340258 | 5/1985 | Fed. Rep. of Germany | 74/574 |

Primary Examiner—Daniel P. Stodola
Attorney, Agent, or Firm—Bachman & LaPointe

[57] ABSTRACT

An apparatus for suppressing torsional and flexural vibrations of rotary shafts which is arranged coaxially to the shaft, has an inner pot constructed as a flange for fixing purposes, an outer rotating ring and elastic damping elements arranged between the pot and the ring including damping elements of a first type which are fixed to the pot and the rotating ring and damping elements of a second type which are only connected to the pot and are separate from the rotating ring. The pot is further characterized by the presence of a plurality of circumferentially distributed slots so that the natural vibration behavior is influenced by speed and improved cooling is effected.

8 Claims, 6 Drawing Figures

APPARATUS FOR SUPPRESSING TORSIONAL VIBRATIONS AND RADIALLY ACTING FLEXURAL VIBRATIONS OF ROTARY SHAFTS

BACKGROUND OF THE INVENTION

The invention relates to an apparatus for suppressing torsional vibrations and flexural vibrations of rotary shafts.

Such vibration damping apparatuses are conventionally used on the drive line of motor vehicles. Known apparatuses for this purpose are constituted by rubber-like or flexible couplings and correspond to a sleeve spring coupling, which is also known as an elastic spring.

In the case of such apparatuses, there is a disk-like or annular elastic body, generally a rubber body between the cylindrical surfaces of in each case one outer and one inner torsionally stiff part. The (rubber) elastic body is generally stressed under tangential couple in operation. The elastic body, which can also be in the form of several parts, absorbs the torsional vibrations of the part to be damped, in this case normally a drive line. However, such elastic springs are used exclusively for absorbing torsional vibrations. In the case of drive lines of machines, in which one component is space-fixed, but the second component connected by means of a universal shaft is space-movable, as a result of the sagging of the universal shaft flexural vibrations occur, which should preferably also be damped. As a result of the space-fixed supporting of the vibration-generating component, this would fundamentally not be possible without additional supports.

The damping of the torsional vibrations and flexural vibrations also results from the rotary movement between the damping mass constructed as a ring and the inner drive part, the damping mass and hardness of the elastic body having to be matched to one another in order to achieve a damping in the case of a desired vibration frequency.

Torsional vibrations are excited by periodic fluctuations of the torques from a prime mover. Flexural vibrations in the universal shaft or the drive component connected thereto, generally a gear, are caused by the translatory movement of the universal shaft or part thereof.

Apparatuses of the present type, conventionally called vibration dampers are described in German patent application Nos. P 33 34 393.4 and P 33 36 174.6. The vibration dampers described therein have a predetermined relationship between the two vibration types, which is fixed by the described construction and in operation cannot be readily adapted to higher speeds. In addition, the fixing points between the metal and elastic are points of weakness, whose loading or stressing should be reduced.

As a result of the continual power rise for drive units, ever increasing demands are made on the damping capacity, so that e.g. in the case of apparatuses according to DE-OS No. 33 34 393 and DE-OS No. 33 36 174 damping heat occurs to an undesired extent and it has not hitherto been possible to remove this in a satisfactory manner.

SUMMARY OF THE INVENTION

The problem of the present invention is therefore to so further develop the known vibration dampers, that torsional and flexural vibrations of a rotary shaft with different frequencies can be damped in a damper in an operationally reliable manner and whilst in particular avoiding overheating, it being possible to set a given ratio between the transverse vibration resonant frequency and the torsional vibration resonant frequency.

According to the invention this problem is solved by an apparatus, wherein the cup or pot has several slots distributed over its circumference permitting an elastic expansion of at least part of the cup or pot jacket under centrifugal force action.

Due to the fact that the driving part is so constructed by multiple axially parallel slots on the circumference that the centrifugal force leads to a radial deflection, varying as a function of the speed, the pot expansion described in DE-OS No. 33 34 393 can be quadratically adapted to the increasing speed of the vibration damper rotating with the shaft to be damped and the damping action of the vibration damper is significantly increased. The extra heat produced by the improved damping is removed in fan-like manner through the slots. The width and length dimensioning of the slots can advantageously take place in such a way that the deflection of the damping elements together with the pot evolves an action in specific speed ranges.

According to an advantageous development, at least one end face of the rotating ring can be constructed as an impeller to improve heat removal.

According to a preferred embodiment of the apparatus according to the invention on either side alongside the damping elements and at least alongside the damping elements of the second type, stops can be provided on the inner wall of the rotating ring in order to limit the loading or stressing of the damping elements in the case of differing rotational speeds between pot and rotating ring to an extent which increases the service life of such elements. The damping elements of the second type, which are constructed separately from the rotating ring are preferably in contact with the latter. It is also possible to construct both damping element types separately from the rotating ring and at least the damping elements of the first type are always in constant contact with the rotating ring.

To further improve the damping heat dissipation, the damping elements can be extended over the rotating ring contour in fan blade-like manner coaxially to the shaft. Instead of or in addition to the damping elements, it is possible to provide stops on the rotating ring inner face for limiting the torsion of the rotating ring with respect to the pot and they can project in paddle-like manner over the rotating ring contour for better cooling the damping element.

In a particularly preferred manner the stops are elastic, it having proved advantageous if damping elements and stops are made from the same material. It is very advantageous that the limitation of the relevant movement between rotating ring and pot by the stops takes place without any metallic contact and therefore noiselessly. It has proved particularly advantageous to use for this purpose e.g. artificial or natural rubber, silicone rubber or some other suitable material.

DETAILED DESCRIPTION OF THE DRAWINGS

Figure 1:
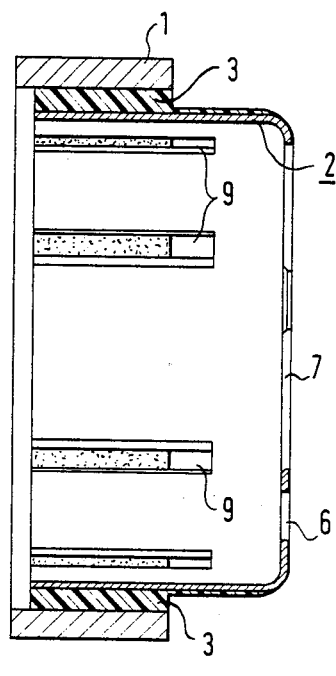

The invention is described in greater detail hereinafter relative to non-limitative embodiments and the attached drawings, wherein show:

FIG. 1. A preferred embodiment of the apparatus according to the invention in plan view.

Figure 2:
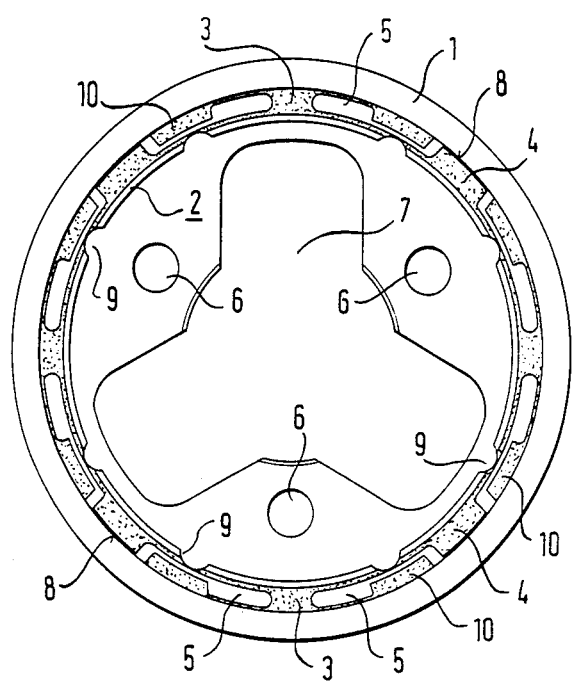

FIG. 2. The apparatus according to FIG. 1 in cross-section.

Figure 3:
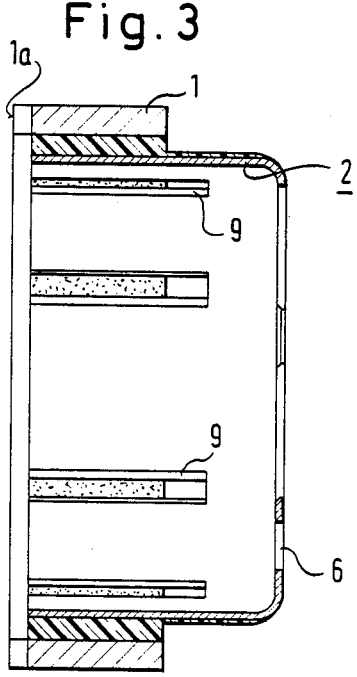

FIG. 3. A further preferred embodiment of the inventive apparatus with an end face constructed as a fan.

Figure 4:
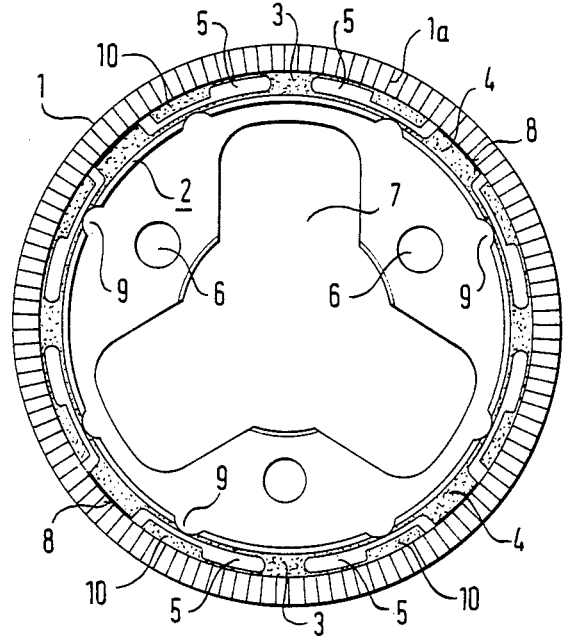

FIG. 4. The apparatus of FIG. 3 in cross-section.

Figure 5:
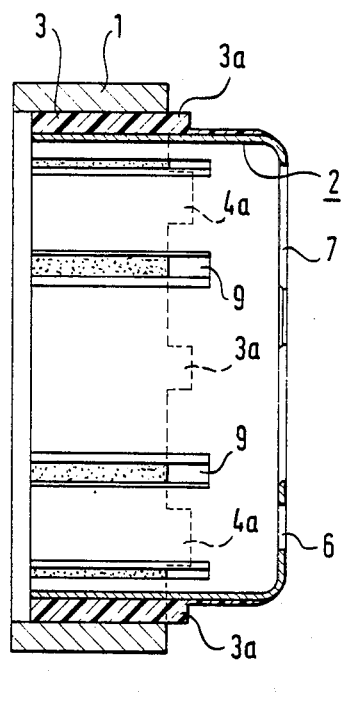

FIG. 5. A further preferred embodiment of the inventive apparatus with damping elements extended over and beyond the rotating ring for cooling purposes.

Figure 6:
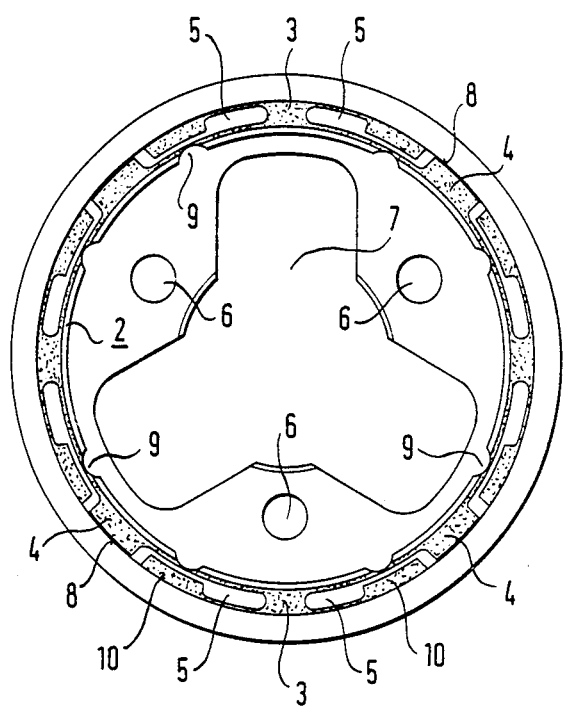

FIG. 6. The apparatus of FIG. 5 in cross-section.

DETAILED DESCRIPTION

FIGS. 1 and 2 show a preferred embodiment of the inventive apparatus with a ring 1 acting as the damping mass and a pot or cup 2 constructed as a flange. Pot 2 is made from an elastic material, preferably metal and is provided in its circumferential region with slot-like recesses or slots 9, which are regularly distributed over the circumference in the direction of the longitudinal axis of a shaft to be damped. Through the dimensioning of these slots, it is possible to control and allow for the expansion of pot 2 at high speeds. Between pot 2 and ring 1 are provided damping elements of the first type 3 which are integral with both the ring 1 and pot 2 (attached) and damping elements of the second type 4 which are integral with the pot and non-integral with the rotating ring (separate from rotating ring 1) and between which are located gaps 5 in which cooling air can circulate. A gap 8 is formed between the damping elements of the second type 4 and the inner wall of ring 1 and the gap influences, as a result of its size, the assigned frequency and therefore the damping action of the inventive apparatus. This gap 8, which can be made randomly small, and the damping element preferably contacts on the rotating ring, so that the gap is really equal to zero, is made at the time of producing the actual vibration damper and if a rubberlike material is provided as the damping element it is produced at the time of the vulcanization thereof. The damping elements 4 functions as follows. Under increased centrifugal force action the second damping elements 4 press against the rotating ring 1 for transferring force thereto when the centrifugal force action reaches a pre-determined level which results in the expansion of pot 2. To the left and right of damping elements 4 are provided on the inner wall of the rotating ring stops 10 and they are advantageously made from the same material as the damping elements and can be vulcanized on. Pot 2 has a flange mount, which has bores 6 for fixing to the shaft to be damped. The central recess 7 in pot 2 is, in the represented preferred embodiment, constructed to receive a three-finger flange, pot 2 being such that it can be turned in bayonet-like manner in the recess.

The inventive embodiment shown in FIGS. 3 and 4 has a rotating ring 1a, which is frontally provided with a ventilation profile constructed in an impeller-like manner, which significantly improves the cooling of the damping element.

FIGS. 5 and 6 show a further preferred embodiment of the inventive apparatus in which and as can in particular be seen in FIG. 5, damping elements 3, 4 extended in paddle-like manner project over rotating ring 1 and particularly assist the dissipation of heat through the damping element gaps 5. It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Apparatus for suppressing torsional vibrations and flexural vibrations of a rotary shaft, which is arranged coaxially to the shaft, said apparatus comprising an internal pot constructed as a flange for fixing said pot to the rotary shaft, an outer rotating ring, elastic damping elements arranged between said pot and said ring, said damping elements including a plurality of first damping elements integral with the pot and the rotating ring and a plurality of second damping elements integral with the pot and non-integral with the rotating ring, and a plurality of circumferentially distributed slots in said pot for permitting an elastic expansion of at least part of the pot under increased centrifugal force action whereby said second damping elements press against said ring for transferring force thereto when said centrifugal force action reaches a pre-determined level.

2. An apparatus according to claim 1 characterized in that at least one end face of said rotating ring is constructed in impeller-like manner.

3. An apparatus according to claim 1 characterized in that said damping elements are extended in paddle-like manner over the contour of said rotating ring axially parallel to the shaft.

4. An apparatus according to claim 1 characterized in that said first damping elements are constructed separately from the rotating ring but are always in constant contact with the inner wall of the rotating ring.

5. An apparatus according to claim 1 further characterized in that a plurality of stops are provided on the inner wall of said rotating ring adjacent said second damping elements.

6. An apparatus according to claim 5 characterized in that the stops are elastically constructed.

7. An apparatus according to claim 5 characterized in that the stops are extended in fan blade-like manner over and beyond the contour of said rotating ring.

8. An apparatus according to claim 5 characterized in that at least some of the damping elements and the stops are constructed from an elastic material.

* * * * *